US012414511B1

United States Patent
Wu et al.

(10) Patent No.: US 12,414,511 B1
(45) Date of Patent: Sep. 16, 2025

(54) WATER SPRINKLER

(71) Applicant: SHENZHEN LINGKE TECHNOLOGY CO., LTD., Shenzhen (CN)

(72) Inventors: Zhiqiang Wu, Shenzhen (CN); Yuliang Zhu, Chongqing (CN); Donglian Xie, Fuzhou (CN); Weimin He, Maoming (CN)

(73) Assignee: SHENZHEN LINGKE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/189,318

(22) Filed: Apr. 25, 2025

(30) Foreign Application Priority Data

Jan. 25, 2025 (CN) .......................... 202520172717.8

(51) Int. Cl.
*A01G 25/16* (2006.01)

(52) U.S. Cl.
CPC ......... *A01G 25/167* (2013.01); *A01G 25/165* (2013.01); *Y02P 60/12* (2015.11)

(58) Field of Classification Search
CPC ..... A01G 25/167; A01G 25/165; Y02P 60/12; Y02P 60/14
See application file for complete search history.

(56) References Cited

U.S. PATENT DOCUMENTS

| | | | | |
|---|---|---|---|---|
| 5,715,866 A | * | 2/1998 | Granger | A01G 25/165 239/69 |
| 5,746,250 A | * | 5/1998 | Wick | A01G 25/165 239/69 |
| 5,813,655 A | * | 9/1998 | Pinchott | A01G 25/165 251/288 |
| 6,397,888 B1 | * | 6/2002 | Wang | A01G 25/165 137/883 |
| 7,216,659 B2 | * | 5/2007 | Caamano | A01G 25/16 239/69 |
| 8,297,312 B2 | * | 10/2012 | Tai | G05D 16/2095 137/624.16 |
| 9,049,821 B1 | * | 6/2015 | Hanna | A01G 25/165 |
| 9,101,098 B2 | * | 8/2015 | Cheng | A01G 25/165 |
| 9,215,848 B2 | * | 12/2015 | Brundisini | A01G 25/16 |
| 9,332,696 B2 | * | 5/2016 | Salsberg | A01G 25/167 |

(Continued)

FOREIGN PATENT DOCUMENTS

| | | | | |
|---|---|---|---|---|
| CN | 202617879 U | * | 12/2012 | .......... A01G 25/165 |
| CN | 210247807 U | * | 4/2020 | |

(Continued)

*Primary Examiner* — David Colon-Morales
(74) *Attorney, Agent, or Firm* — Jose Cherson Weissbrot

(57) ABSTRACT

The present application relates to a water sprinkler, including a housing, a solar module, a battery module, a water inlet/outlet pipe, and a control module, where the water inlet/outlet pipe and the control module are arranged in the housing, the solar module is arranged outside the housing and rotatably connected to the housing, the water inlet/outlet pipe is provided with at least one control valve, the control module is in communication connection with the control valve and controls the opening and closing of the control valve, and the solar module, the control module and the control valve are each electrically connected to the battery module.

7 Claims, 6 Drawing Sheets

(56) References Cited

U.S. PATENT DOCUMENTS

| | | | | |
|---|---|---|---|---|
| 9,380,750 | B2* | 7/2016 | Wang | A01G 25/165 |
| 9,581,264 | B1* | 2/2017 | Ericksen | F16K 27/003 |
| 9,795,095 | B2* | 10/2017 | Franchini | F16K 11/24 |
| 10,455,782 | B2* | 10/2019 | Baldwin | A01G 25/165 |
| 10,599,121 | B2* | 3/2020 | Wang | G05B 19/108 |
| 10,757,873 | B2* | 9/2020 | Weiler | G05B 19/048 |
| 10,959,385 | B1* | 3/2021 | Chen | F16K 31/48 |
| 10,966,380 | B1* | 4/2021 | Goldwasser | F16K 37/0025 |
| 10,973,182 | B1* | 4/2021 | Bangerter | G05B 15/02 |
| 12,178,167 | B2* | 12/2024 | Carter | A01G 25/162 |
| 2015/0070188 | A1* | 3/2015 | Aramburu | A01G 25/167 |
| | | | | 340/870.02 |
| 2015/0359185 | A1* | 12/2015 | Guy | G05D 1/0246 |
| | | | | 239/11 |
| 2018/0160636 | A1* | 6/2018 | Hester | A01G 25/165 |
| 2020/0178484 | A1* | 6/2020 | Kert | H02S 20/32 |

FOREIGN PATENT DOCUMENTS

| | | | | |
|---|---|---|---|---|
| CN | 111357617 A * | 7/2020 | | A01G 7/045 |
| CN | 112293208 A * | 2/2021 | | A01G 25/023 |
| CN | 114916404 A * | 8/2022 | | A01G 25/167 |
| CN | 115500241 A * | 12/2022 | | A01G 25/02 |
| CN | 116420595 A * | 7/2023 | | F16K 37/0083 |
| CN | 117329341 A * | 1/2024 | | H04W 28/14 |
| CN | 221615837 U * | 8/2024 | | |
| CN | 118765765 A * | 10/2024 | | A01G 25/02 |
| DE | 102006010343 A1 * | 6/2007 | | A01G 25/16 |
| DE | 202013001794 U1 * | 5/2013 | | A01G 25/165 |
| DE | 102013109009 B4 * | 6/2018 | | G04C 23/04 |
| DE | 102021116221 A1 * | 12/2022 | | A01G 25/16 |
| EP | 2946656 A1 * | 11/2015 | | A01G 25/165 |
| EP | 2997821 A1 * | 3/2016 | | A01G 25/167 |
| EP | 3777523 A1 * | 2/2021 | | A01G 25/165 |
| WO | WO-2018039913 A1 * | 3/2018 | | A01G 25/02 |

* cited by examiner

WATER SPRINKLER

TECHNICAL FIELD

The present application relates to the technical field of water sprinklers, and in particular to a water sprinkler.

BACKGROUND

Generally, watering is manually controlled. However, with urban greening and continuous enlargement of horticultural scale, traditional manual watering methods cannot meet the requirements for efficient and precision irrigation.

Therefore, there are proposed a number of automatic water sprinklers on the market.

SUMMARY

The present application provides a water sprinkler, including a housing, a solar module, a battery module, a water inlet/outlet pipe, and a control module, where the water inlet/outlet pipe and the control module are arranged in the housing, and the solar module is arranged outside the housing and rotatably connected to the housing; the water inlet/outlet pipe is provided with at least one control valve, and the control module is in communication connection with the control valve and controls the opening and closing of the control valve; the solar module, the control module and the control valve are each electrically connected to the battery module; and
- the water inlet/outlet pipe is provided with a water inlet and at least one water outlet, the number of the control valves matches the number of the water outlets, and the control valve controls the opening and closing of a corresponding water outlet;
- the water sprinkler further comprising a charging interface module electrically connected to the battery module; where the housing includes a front housing and a rear housing, the front housing being detachably connected to the rear housing, the front housing being provided with a mounting groove, and the solar module and the charging interface module being both arranged in the mounting groove; and
- the solar module includes a solar panel, a mounting base and a rotating member, the solar panel being mounted on the mounting base and electrically connected to the battery module, and the mounting base being rotatably connected to the front housing by the means of the rotating member.

BRIEF DESCRIPTION OF THE DRAWINGS

In order to more clearly describe the technical solutions in the embodiments of the present application or the prior art, the drawings necessary for describing the embodiments or the prior art will be briefly described below. Apparently, the drawings in the description below merely show some of the embodiments of the present application, and those of ordinary skill in the art would have obtained other drawings from these drawings without involving any inventive effort.

LIST OF REFERENCE SIGNS

Figure 1:
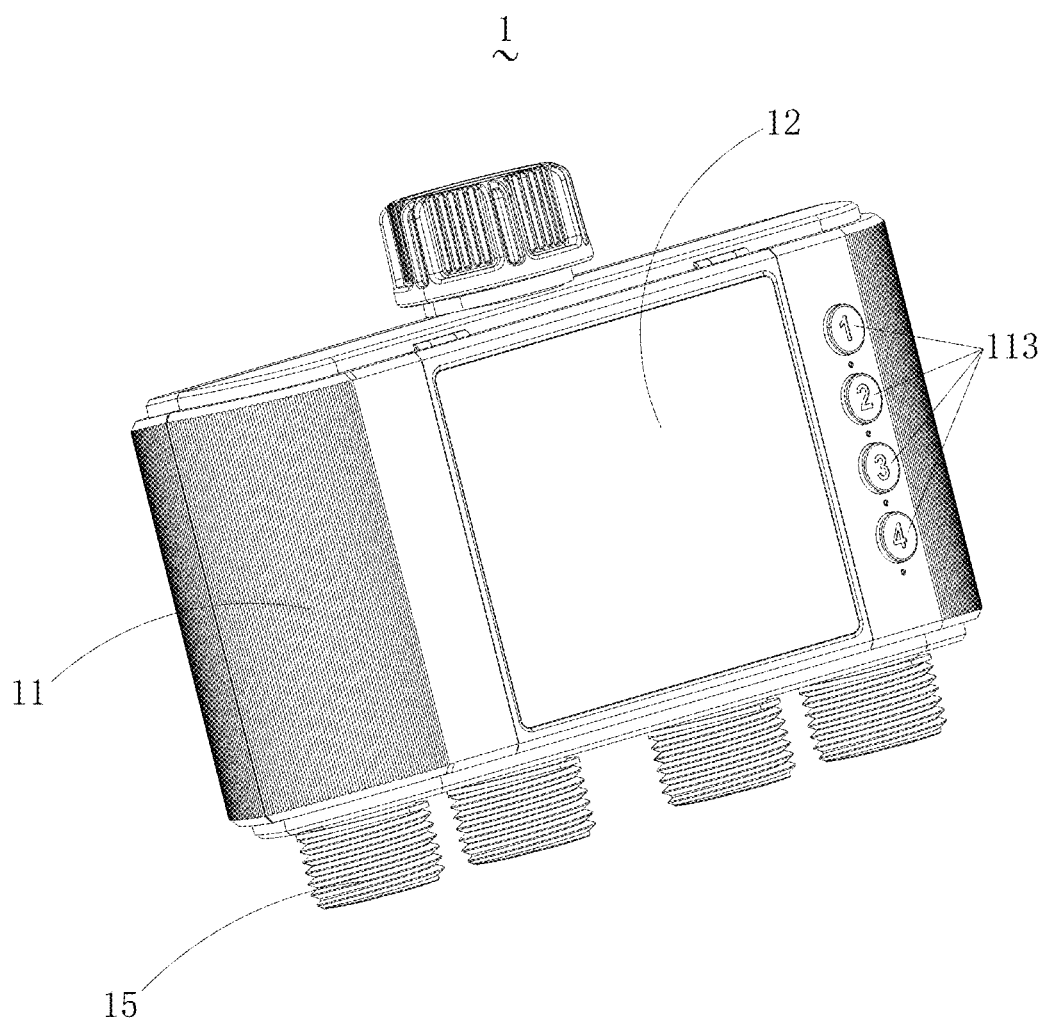
FIG. 1 is a first structural schematic perspective view of a water sprinkler according to an embodiment of the present application.
Figure 2:
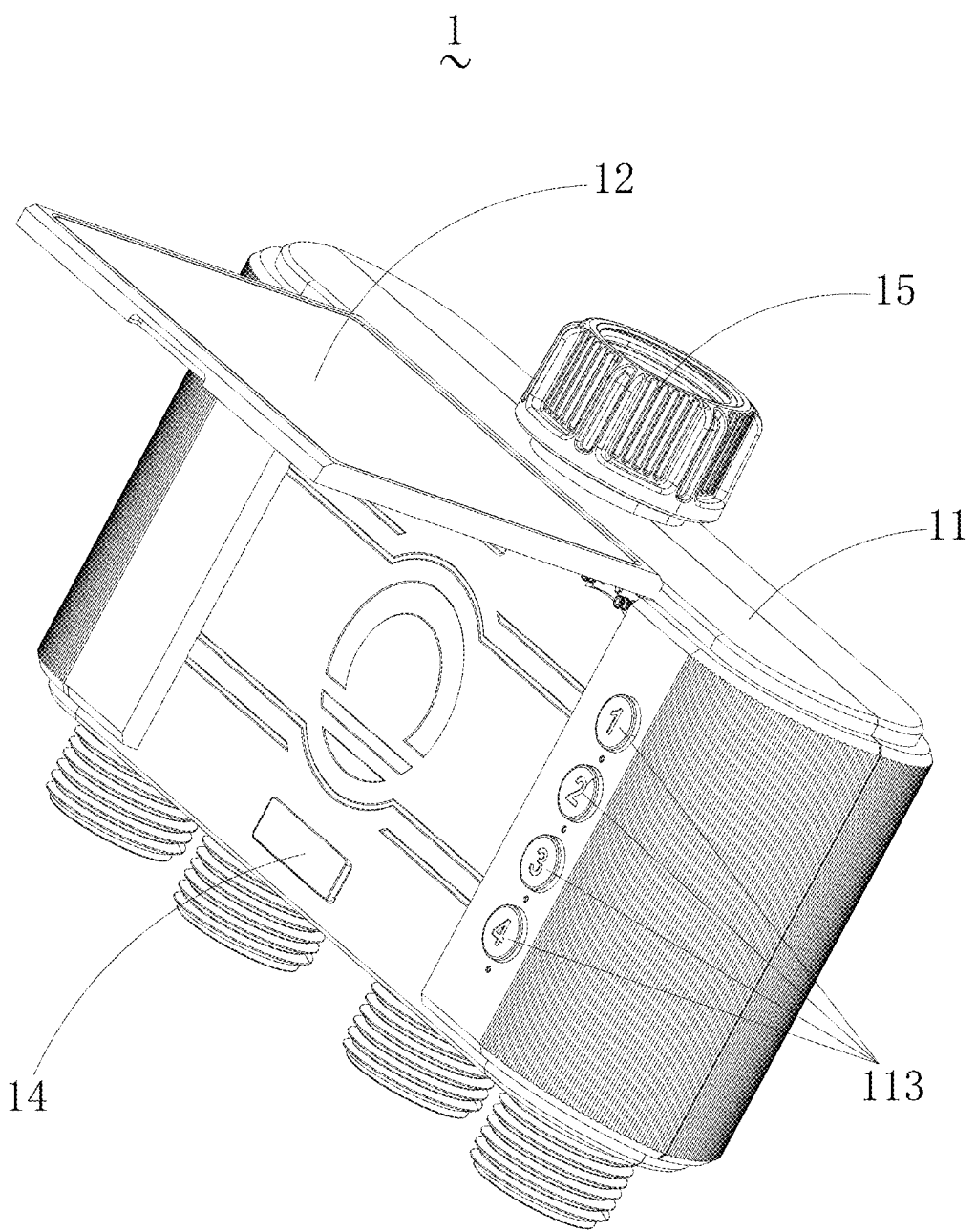
FIG. 2 is a second structural schematic perspective view of an water sprinkler according to the embodiment of the present application.
Figure 3:
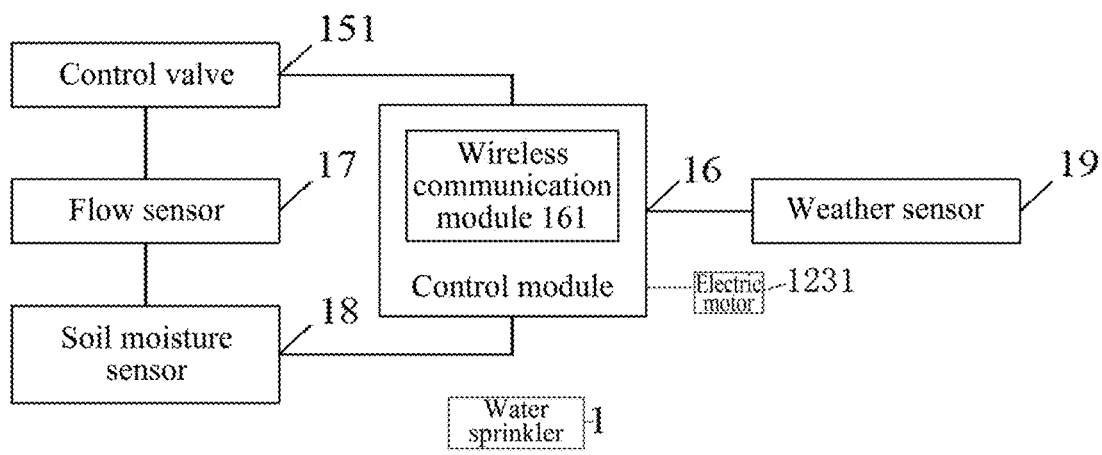
FIG. 3 is a schematic diagram of a functional module of the water sprinkler according to an embodiment of the present application.

1. Water sprinkler; 11. Housing; 12. Solar module; 13. Battery module; 14. Charging interface module; 15. Water inlet/outlet pipe; 16. Control module; 17. Flow sensor; 18. Soil moisture sensor; 19. Weather sensor; 111. Front housing; 112. Rear housing; 113. Physical key; 151. Control valve; 152. Water inlet; 153. Water outlet; 121. Solar panel; 122. Mounting base; 123. Rotating member; 161. Wireless communication module; 1111. Mounting groove.

DETAILED DESCRIPTION OF EMBODIMENTS

For ease of understanding of the present application, a more complete description of the present application will be made with reference to relevant drawings. Embodiments of the present application are illustrated in the accommodating drawings. However, the present application may be implemented in many different forms and is not limited to the embodiments described herein. On the contrary, these embodiments are intended to make the disclosure of the present application more thorough and comprehensive.

Unless otherwise defined, all technical and scientific terms used herein shall have the same meanings as commonly understood by those skilled in the art to which this application relates. The terms used herein in the specification of the present application are only used to describe specific embodiments, and are not intended to limit the present application.

It should be understood that the singular forms of "a", "an" and "the/this" used in the present application may also include plural forms, unless clearly indicated otherwise in the context. It should also be understood that the terms such as "include/comprise" and "have" specify the presence of mentioned features, units, steps, operations, components, portions, or combinations thereof, but do not exclude the presence or addition of one or more other features, units, steps, operations, components, portions, or combinations thereof.

It should be noted that when an element is referred to as being "fixed to" another element, the element may be directly located on the other element or an intermediate element may exist. When one element is considered to be "connected" to another element, the element may be directly connected to another element or an intermediate element may also be present. The terms "vertical", "horizontal", "left", "right" and similar expressions used herein are for the purpose of illustration only.

In the present application, orientations or position relationships indicated by terms such as "upper", "lower", "left", "right", "front", "rear", "top", "bottom", "inner", "outer", "middle", "vertical", "horizontal", "transverse" and "longitudinal" are based on orientations or position relationships shown in the accommodating drawings. These terms are mainly intended to better describe the present application and the embodiments thereof and are not intended to limit that a mentioned device, element or constituent part must have a specific orientation, or be constructed and operated in a specific orientation. Moreover, some of the above terms may be used to denote other meanings apart from the orientations or positional relationships. For example, the term "upper" may also be used to denote a certain attachment relationship or connection relationship in some circumstances. For those skilled in the art, the specific meanings of the terms mentioned above in the present application may be construed according to specific circumstances.

In addition, the terms "mount", "arrange", "provide", "connect" and "couple" should be understood in a broad sense. For example, it may be a fixed connection, a detachable connection, or an integral construction, may be a mechanical connection, or an electrical connection, or may be a direct connection, an indirect connection by means of an intermediate medium, or internal communication between two means, elements or constituent parts. The specific meanings of the above terms in the present application may be understood by those skilled in the art according to specific situations.

Referring to FIGS. 1-4, the embodiments of the present application provide a water sprinkler 1. The water sprinkler 1 includes a housing 11, a solar module 12, a battery module 13, a charging interface module 14, a water inlet/outlet pipe 15 and a control module 16.

The water inlet/outlet pipe 15 and the control module 16 are both arranged in the housing 11, the charging interface module 14 is exposed from the housing 11, and the solar module 12 is arranged outside the housing 11 and rotatably connected to the housing 11. The water inlet/outlet pipe 15 is provided with at least one control valve 151, and the control module 16 is in communication connection with the control valve 151 and controls the opening and closing of the control valve 151. The charging interface module 14, the solar module 12, the control module 16 and the control valve 151 are each electrically connected to the battery module 13.

Optionally, the charging interface module 14 is a Type-C interface module, a Micro USB interface module, or a Lighting interface module.

Specifically, the battery module 13 is a supercapacitor or an ordinary rechargeable battery.

Specifically, the control valve 151 is an electric valve.

In some embodiments, the housing 11 is further provided with physical keys 113 connected to the control valves 151, and the control valves 151 are operated by the physical keys 113 to open and close.

It should be understood that the control module 16, as a core of the whole system of the water sprinkler 1, is responsible for receiving signals, executing control algorithms and sending control instructions.

It should be understood that the solar module 12 uses a high-efficiency solar panel to convert solar energy into electrical energy, which is stored in the battery module 13 to ensure the continuous operation of the water sprinkler 1 during the day and when sunlight is sufficient. The charging interface module 14 performs fast charging with a standard power adapter, is suitable for use in situations where solar energy is insufficient, for example, at night or in cloudy days, to ensure stable power supply for the water sprinkler 1.

The water sprinkler 1 according to the embodiments of the present application is powered with solar energy, the problem is solved that an existing watering system relies on a fixed power source in most cases, is high in mounting and maintenance costs, is difficult to operate for a long period of time in an environment where energy supply is unstable, and thus causes poor irrigation effect and low irrigation efficiency, stable power support can be provided for the water sprinkler 1, long-term stable operation of the water sprinkler 1 in various environments is ensured, and thus the irrigation effect and irrigation efficiency of the water sprinkler 1 are improved. In addition, the opening and closing of the control valve 151 are controlled by the control module 16, and the opening and closing of the water inlet/outlet pipe 15 can thus be controlled, so that the intelligentization of the water sprinkler 1 can be improved, and intelligent irrigation according to actual requirements is facilitated. Moreover, the provision of the charging interface module 14 enables dual-mode power supply based on solar energy and an external power supply can be achieved, and the long-term stable operation of the water sprinkler 1 in various environments is further ensured.

Figure 4:
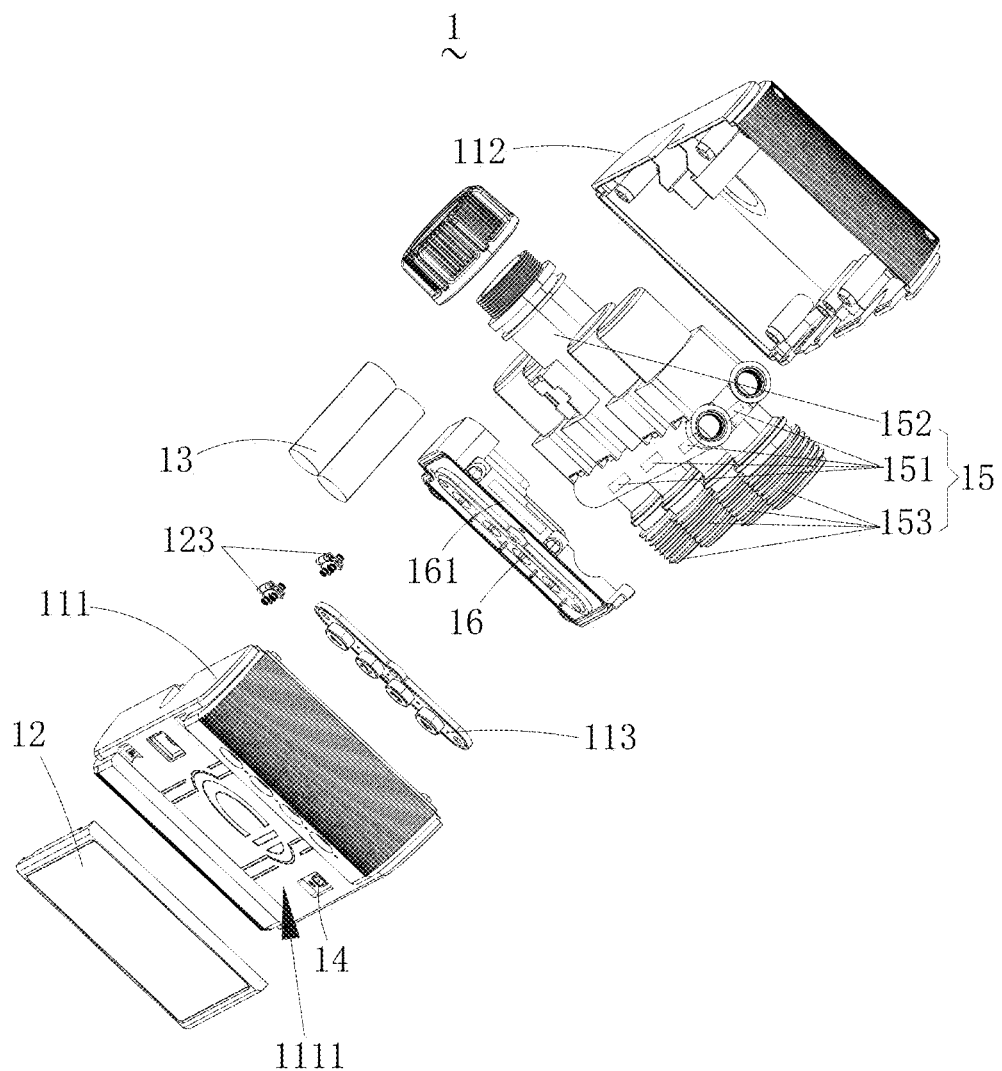
FIG. 4 is an exploded structural schematic view of the water sprinkler according to an embodiment of the present application.
Figure 5:
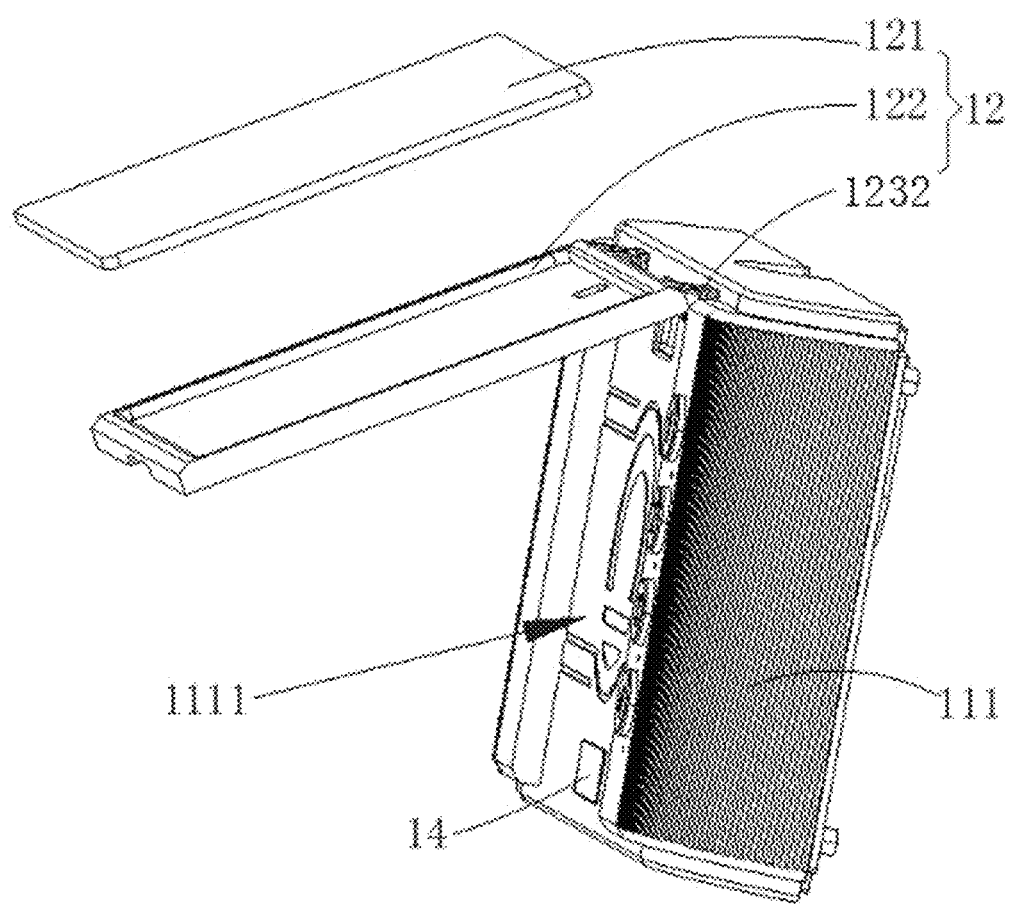
FIG. 5 is a partial structural schematic view of the water sprinkler according to an embodiment of the present application.

As shown in FIGS. 4 and 5, the housing 11 includes a front housing 111 and a rear housing 112, and the front housing 111 is detachably connected to the rear housing 112. The front housing 111 is provided with a mounting groove 1111, and the solar module 12 and the charging interface module 14 are both provided in the mounting groove 1111.

Specifically, the mounting groove 1111 matches the solar module 12 in shape and size to facilitate the storage of the solar module 12 in the mounting groove 1111.

In the embodiments of the present application, the assembly and later maintenance of the water sprinkler 1 are facilitated by providing the front housing 111 and the rear housing 112 that are detachably connected. Furthermore, the solar module 12 and the charging interface module 14 are assembled by providing the mounting groove 1111, so that the integration level of the water sprinkler 1 can be improved, reducing the overall size of the water sprinkler 1.

Specifically, the solar module 12 includes a solar panel 121, a mounting base 122 and a rotating member 123, where the solar panel 121 is mounted on the mounting base 122 and electrically connected to the battery module 13, and the mounting base 122 is rotatably connected to the front housing 111 by means of the rotating member 123.

In some embodiments, the rotating member 123 is a hinge 1232, and a connection is made by means of the hinge 1232 to make the assembly simple, convenient and quick, so that an angle of rotation of the solar panel 121 can be achieved by manually turning the mounting base 122.

In some embodiments, the rotating member 123 is an electric motor 1231, the electric motor 1231 is in communication connection with the control module 16, and the control module 16 controls the angle of rotation of the solar panel 121 by means of the electric motor 1231, so that the water sprinkler is more intelligent and automated.

Figure 6:
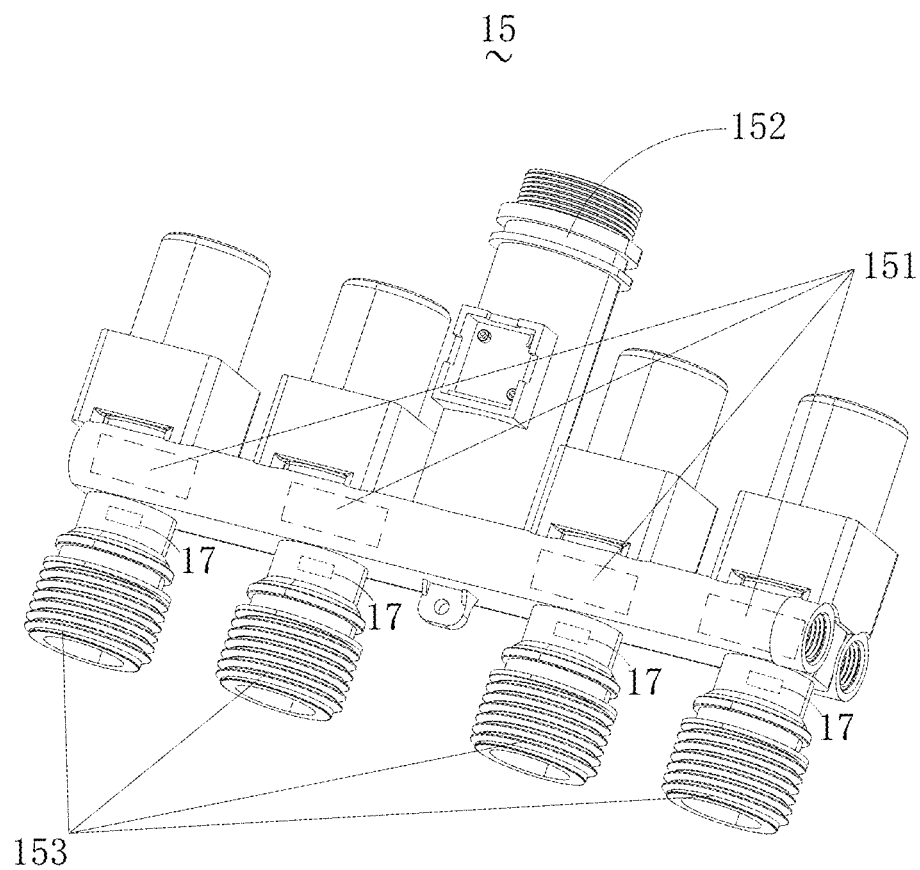
FIG. 6 is a structural schematic perspective view of a water inlet/outlet pipe of a water sprinkler according to an embodiment of the present application.
Figure 7:
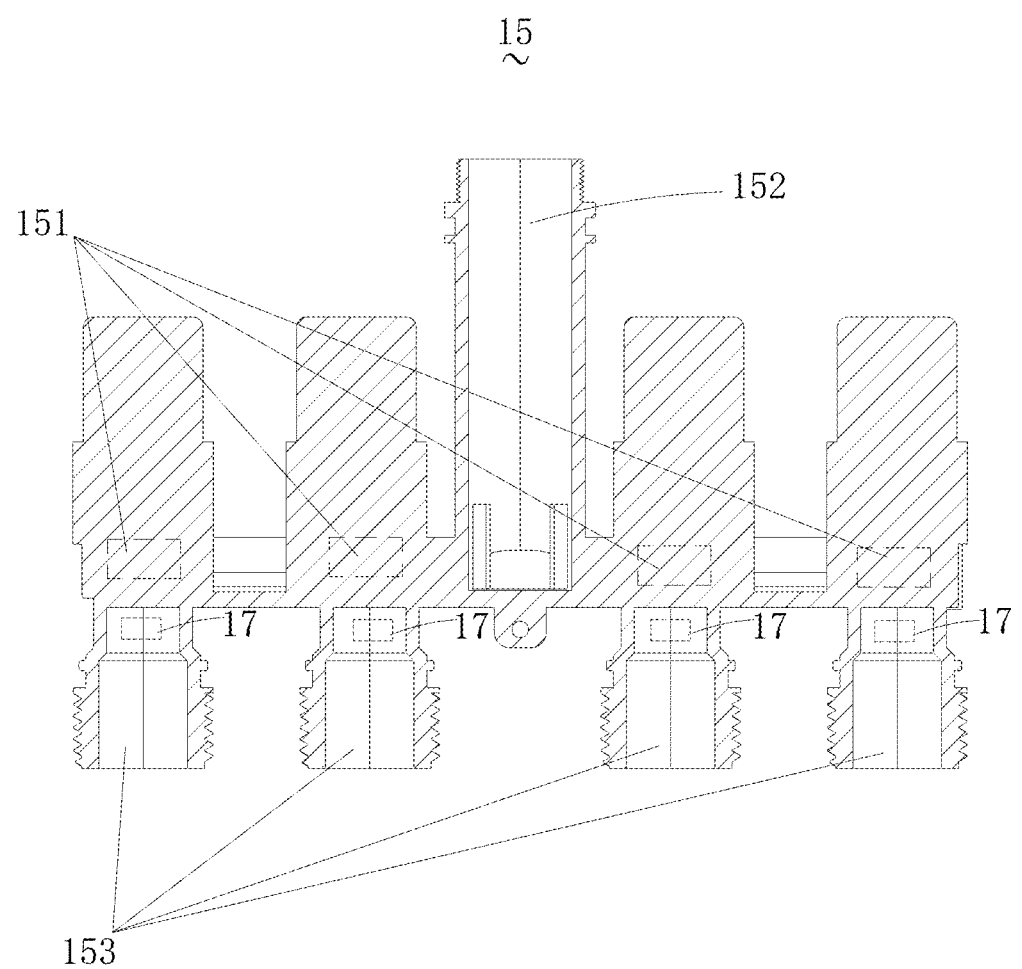
FIG. 7 is a structural schematic sectional view of a water inlet/outlet pipe of a water sprinkler according to an embodiment of the present application.

As shown in FIGS. 6 and 7, the water inlet/outlet pipe 15 is provided with a water inlet 152 and at least one water outlet 153, where the water inlet 152 is arranged on one side of the water inlet/outlet pipe 15, and the water outlet 153 is arranged on the opposite side of the water inlet/outlet pipe 15. The number of the control valves 151 matches the number of the water outlets 153, and the control valves 151 control the opening and closing of corresponding water outlets 153.

Specifically, the water inlet/outlet pipe 15 is provided with four water outlets 153, the water inlet/outlet pipe 15 is provided with four control valves 151, and the four control valves 151 are independent of each other and respectively control the opening and closing of the four water outlets 153.

Specifically, the four water outlets 153 are arranged in parallel.

In some embodiments, a spray head is assembled at each of the water outlets 153 to support the switching of different types of spray heads and meet diversified horticultural requirements.

In some embodiments, the four control valves 151 independent of each other are provided to control the four water outlets 153 to allow the four water outlets 153 to be controlled respectively according to control instructions. According to the requirements of different plants or regions, the volume and time of the irrigation are set respectively to achieve precision irrigation, such that four-channel intelligent watering of the water sprinkler 1 is thus achieved, the irrigation efficiency is improved, water resources are also saved, and operation procedures are simplified.

Still referring to FIGS. 3, 4, 6 and 7, the water sprinkler 1 further includes flow sensors 17, where the number of the flow sensors 17 matches the number of the water outlets 153, the flow sensors 17 are in communication connection with the control module 16, and the flow sensors 17 are configured to monitor the water flows of corresponding water outlets 153. With this configuration, a corresponding watering volume can be set according to actual requirements, it can be ensured that the irrigation volume meet the set requirements, and the irrigation efficiency can be further improved.

It can be understood that a plurality of flow sensors 17 achieve the monitoring of a plurality of water outlets 153, and each of the flow sensors 17 monitors a corresponding one of the water outlets 153.

Specifically, in some embodiments, the number of the flow sensors 17 is four, the number of the water outlets 153 is four, and the four flow sensors 17 similarly control the opening and closing of the corresponding water outlets 153.

In addition, the flow sensors 17 can also detect abnormalities such as water leakage or blockage, and alert a user with a system alarm.

The water sprinkler 1 further includes a soil moisture sensor 18 in communication connection with the control module 16 and configured to monitor soil moisture. With such a configuration, an environment can be monitored in real time to intelligently adjust irrigation plans and save water resources.

The water sprinkler 1 further includes a weather sensor 19 in communication connection with the control module 16 and configured to monitor ambient temperature, ambient humidity and ambient rainfall. With such a configuration, the environment can be monitored in real time to avoid irrigation during rainfall, further saving the water resources.

It should be understood that the battery module 13 is electrically connected to the control module 16, the flow sensors 17, the soil humidity sensor 18 and the weather sensor 19 to supply power for the entire system of the water sprinkler 1.

The control module 16 is integrated with a wireless communication module 161, and the wireless communication module 161 is at least one of a WiFi module, a Bluetooth module and a Zigbee module. By being integrated with the wireless communication module 161, the water sprinkler 1 can be wirelessly connected to a smart phone, a tablet computer, etc., such that the water sprinkler 1 can perform two-way data interaction with a mobile device of the user to achieve remote management and monitoring.

The embodiments of the present application further provide an operation interface for the user by means of a liquid crystal display screen or a mobile application, allowing the user to set the irrigation plans for channels and view real-time data and system status.

The technical features of the above embodiments may be combined arbitrarily. For the purpose of brevity of description, all the possible combinations of the technical features in the above embodiments are not described. However, as long as there is no contradiction between the combinations of these technical features, they shall all fall within the scope of the description.

The embodiments described above merely illustrate several implementations of the present application and are described relatively specifically and in detail, but should not be construed as limiting the patent scope of the present application. It should be noted that several variations and improvements may also be made by those of ordinary skill in the art without departing from the concept of the present application, and should fall within the scope of protection of the present application. Therefore, the scope of protection of the present application shall be defined by the appended claims.

The invention claimed is:

1. A water sprinkler, comprising a housing, a solar module, a battery module, a water inlet/outlet pipe, and a control module, wherein the water inlet/outlet pipe and the control module are arranged in the housing, and the solar module is arranged outside the housing and rotatably connected to the housing; the water inlet/outlet pipe is provided with at least one control valve, and the control module is in communication connection with the control valve and controls the opening and closing of the control valve; and the solar module, the control module and the control valve are each electrically connected to the battery module; and the water inlet/outlet pipe is provided with a water inlet and at least one water outlet, the number of the control valves matches the number of the water outlets, and the control valve controls the opening and closing of a corresponding water outlet;

the water sprinkler further comprising a charging interface module electrically connected to the battery module; wherein the housing comprises a front housing and a rear housing, the front housing being detachably connected to the rear housing, the front housing being provided with a mounting groove, and the solar module and the charging interface module being both arranged in the mounting groove; and the solar module comprises a solar panel, a mounting base and a rotating member, the solar panel being mounted on the mounting base and electrically connected to the battery module, and the mounting base being rotatably connected to the front housing by the means of the rotating member.

2. The water sprinkler of claim 1, wherein the rotating member is a hinge.

3. The water sprinkler of claim 1, wherein the rotating member is an electric motor in communication connection with the control module, and the control module controls an angle of rotation of the solar panel by means of the electric motor.

4. The water sprinkler of claim 1, further comprising flow sensors, the number of the flow sensors matching the number of the water outlets; and the flow sensors being in communication connection with the control module, and configured to monitor water flows of corresponding water outlets.

5. The water sprinkler of claim 1, further comprising a soil moisture sensor, the soil moisture sensor being in communication connection with the control module and configured to monitor soil moisture.

6. The water sprinkler of claim 1, further comprising a weather sensor, the weather sensor being in communication connection with the control module and configured to monitor ambient temperature, ambient humidity and ambient rainfall.

7. The water sprinkler of claim 1, wherein the control module is integrated with a wireless communication module, the wireless communication module being at least one of a WiFi module, a Bluetooth module and a Zigbee module.

* * * * *